United States Patent
Kuznetsov et al.

(10) Patent No.: US 11,149,184 B2
(45) Date of Patent: Oct. 19, 2021

(54) METHODS OF RECOVERING A HYDROCARBON MATERIAL

(71) Applicant: BAKER HUGHES HOLDINGS LLC, Houston, TX (US)

(72) Inventors: Oleksandr V. Kuznetsov, Manvel, TX (US); Devesh K. Agrawal, Houston, TX (US); Radhika Suresh, Sugar Land, TX (US); Oleg A. Mazyar, Katy, TX (US); Valery N. Khabashesku, Houston, TX (US); Qusai Darugar, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/117,176

(22) Filed: Aug. 30, 2018

(65) Prior Publication Data

US 2019/0010382 A1   Jan. 10, 2019

Related U.S. Application Data

(63) Continuation-in-part of application No. 15/973,028, filed on May 7, 2018, now abandoned.
(Continued)

(51) Int. Cl.
*E21B 43/16* (2006.01)
*C09K 8/584* (2006.01)
(Continued)

(52) U.S. Cl.
CPC ............. *C09K 8/584* (2013.01); *C09K 8/594* (2013.01); *E21B 43/16* (2013.01); *E21B 43/20* (2013.01); *E21B 43/24* (2013.01); *C09K 2208/10* (2013.01)

(58) Field of Classification Search
CPC .......... C09K 8/584; E21B 43/20; E21B 43/24
(Continued)

(56) References Cited

U.S. PATENT DOCUMENTS 6,302,209 B1 * 10/2001 Thompson, Sr. ... B01F 17/0028
166/305.1
2012/0175120 A1   7/2012 Holcomb et al.
(Continued)

OTHER PUBLICATIONS

Zhang et al., Enhanced Oil Recovery (EOR) Using Nanoparticle Dispersions: Underlying Mechanism and Imbibition Experiments, Energy & Fuels vol. 28, (2014), pp. 3002-3009.
(Continued)

*Primary Examiner* — William D Hutton, Jr.
*Assistant Examiner* — Ashish K Varma
(74) *Attorney, Agent, or Firm* — TraskBritt

(57) ABSTRACT

A method of recovering hydrocarbons comprises introducing a suspension comprising nanoparticles to a material and contacting surfaces of the material with the suspension. After introducing the suspension comprising the nanoparticles to the material, the method further includes introducing at least one charged surfactant to the material and removing hydrocarbons from the material. Accordingly, in some embodiments, the nanoparticles may be introduced to the material prior to introduction of the surfactant to the material. Related methods of recovering hydrocarbons from a material are also disclosed.

13 Claims, 6 Drawing Sheets

Related U.S. Application Data

(60) Provisional application No. 62/504,731, filed on May 11, 2017.

(51) Int. Cl.
  *C09K 8/594* (2006.01)
  *E21B 43/20* (2006.01)
  *E21B 43/24* (2006.01)

(58) Field of Classification Search
  USPC ........................................................ 166/300
  See application file for complete search history.

(56) References Cited

U.S. PATENT DOCUMENTS

| | | | |
|---|---|---|---|
| 2012/0181029 A1* | 7/2012 | Saini | C09K 8/467 166/307 |
| 2015/0144343 A1 | 5/2015 | Mazyar et al. | |
| 2015/0218435 A1 | 8/2015 | Suresh et al. | |
| 2015/0225655 A1* | 8/2015 | Adams | C10G 25/003 516/138 |
| 2015/0344769 A1* | 12/2015 | Suresh | C09K 8/584 166/305.1 |
| 2015/0344786 A1 | 12/2015 | Kuznetsov et al. | |
| 2015/0353836 A1 | 12/2015 | Kuznetsov et al. | |
| 2016/0115372 A1 | 4/2016 | Chakraborty et al. | |
| 2016/0348488 A1 | 12/2016 | Mazyar et al. | |
| 2016/0376492 A1* | 12/2016 | Chakraborty | E21B 43/16 166/267 |

OTHER PUBLICATIONS

Singh et al., Synergy Between Nanoparticles and Surfactants in Stabilizing Foams for Oil Recovery, Energy & ruels, (Feb. 2015), pp. A-M.

Rahimi et al., Experimental Study of the Nanoparticles Effect on Surfactant Absorption and Oil Recovery in One of the Iranian Oil Reservoirs, Petroleum Science and Technology, vol. 33, No. 1 (2015), pp. 79-85.

Suresh et al., Compositions of Matter Comprising Suspended Nanoparticles and Related Methods, U.S. Appl. No. 15/940,459, filed Mar. 29, 2018.

\* cited by examiner

METHODS OF RECOVERING A HYDROCARBON MATERIAL

CROSS-REFERENCE TO RELATED APPLICATIONS

This application is a continuation-in-part of U.S. patent application Ser. No. 15/973,028, filed May 7, 2018, which claims the benefit under 35 U.S.C. § 119(e) of U.S. Provisional Patent Application Ser. No. 62/504,731, filed May 11, 2017, the disclosure of each of which is hereby incorporated herein in its entirety by this reference.

TECHNICAL FIELD

Embodiments of the disclosure relate generally to methods of obtaining a hydrocarbon from a material. More particularly, embodiments of the disclosure relate to methods of recovering a hydrocarbon material from a material, such as from a subterranean formation, using nanoparticles and one or more charged surfactants, and to related methods.

BACKGROUND

Water flooding is a conventional process of enhancing the extraction of hydrocarbon materials (e.g., crude oil, natural gas, etc.) from subterranean formations. In this process, an aqueous fluid (e.g., water, brine, etc.) is injected into the subterranean formation through injection wells to sweep a hydrocarbon material contained within interstitial spaces (e.g., pores, cracks, fractures, channels, etc.) of the subterranean formation toward production wells offset from the injection wells. One or more additives may be added to the aqueous fluid to assist in the extraction and subsequent processing of the hydrocarbon material.

For example, in some approaches, a surfactant or solid particles (e.g., colloids) are added to the aqueous fluid. The surfactant or the solid particles can adhere to or gather at interfaces between a hydrocarbon material and an aqueous material to form a stabilized emulsion of one of the hydrocarbon material and the aqueous material dispersed in the other of the hydrocarbon material and the aqueous material. Surfactants may decrease the surface tension between the hydrocarbon phase and the water phase, such as, for example, in an emulsion of a hydrocarbon phase dispersed within an aqueous phase. Stabilization by the surfactant or the solid particles may lower the interfacial tension between the hydrocarbon and the aqueous phase and reduce the energy of the system, preventing the dispersed material (e.g., the hydrocarbon material, or the aqueous material) from coalescing, and maintaining the one material dispersed as units (e.g., droplets) throughout the other material. Reducing the surface tension increases the permeability and the flowability of the hydrocarbon material. As a consequence, the hydrocarbon material may be more easily transported through and extracted from the subterranean formation as compared to water flooding processes that do not employ the addition of a surfactant or solid particles. The effectiveness of the emulsion is determined in large part by the ability of the emulsion to remain stable at wellbore conditions (e.g., high temperature, high salinity, etc.) and ensure mixing of the two phases.

However, application of surfactants is usually limited by the cost of the surfactants and their adsorption and loss onto the rock of the hydrocarbon-containing formation. Disadvantageously, the effectivity of various surfactants can be detrimentally reduced in the presence of dissolved salts (e.g., such as various salts typically present within a subterranean formation). In addition, surfactants may have a tendency to adsorb onto surfaces of the subterranean formation, resulting in the economically undesirable addition of more surfactant to the injected aqueous fluid to account for such losses. Solid particles can be difficult to remove from the stabilized emulsion during subsequent processing, preventing the hydrocarbon material and the aqueous material thereof from coalescing into distinct, immiscible components, and greatly inhibiting the separate collection of the hydrocarbon material. Furthermore, the surfactants are often functional or stable only within particular temperature ranges and may lose functionality at elevated temperatures or various conditions encountered within a subterranean formation.

BRIEF SUMMARY

Embodiments disclosed herein include methods of recovering hydrocarbons from a subterranean formation. For example, in accordance with one embodiment, a method of recovering hydrocarbons from a subterranean formation comprises introducing a suspension comprising silica nanoparticles into a subterranean formation, contacting surfaces of the subterranean formation with the suspension to form a layer of the silica nanoparticles on at least some surfaces of the subterranean formation, after introducing the suspension comprising silica nanoparticles into the subterranean formation, introducing a solution comprising at least one anionic surfactant into the subterranean formation, and extracting hydrocarbons from the subterranean formation.

In additional embodiments, a method of recovering hydrocarbons from a subterranean formation comprises mixing silica nanoparticles having a diameter less than about 100 nm with a carrier fluid comprising brine and at least one anionic surfactant to form a suspension, introducing the suspension into a subterranean formation having a temperature greater than about 50° C., and extracting hydrocarbons from the subterranean formation.

In yet additional embodiments, a method of recovering hydrocarbons from a subterranean formation, comprises introducing a suspension comprising nanoparticles selected from the group consisting of silica and aluminum silicate into a subterranean formation, adhering the nanoparticles to surfaces within the subterranean formation, and after introducing the suspension comprising nanoparticles into the subterranean formation, introducing a solution comprising at least one anionic surfactant into the subterranean formation.

In further embodiments, a method of recovering hydrocarbons comprises introducing a suspension comprising nanoparticles to a material, contacting surfaces of the material with the suspension, after introducing the suspension comprising the nanoparticles to the material, introducing at least one charged surfactant to the material, and removing hydrocarbons from the material.

In additional embodiments, a method of recovering hydrocarbons comprises introducing a fluid comprising at least one charged surfactant and nanoparticles comprising aluminum atoms and silicon atoms to a material at a temperature greater than about 50° C., and removing hydrocarbons from the material.

In yet further embodiments, a method of recovering hydrocarbons comprises introducing nanoparticles selected from the group consisting of silica, aluminum silicate, and alumina modified silica nanoparticles, and metal oxide modified nanoparticles, adhering the nanoparticles to the material, and after introducing the nanoparticles to the material, introducing at least one surfactant to the material.

DETAILED DESCRIPTION

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for recovering a hydrocarbon material from a material, such as from a subterranean formation, oil sands, bitumen, or from another material comprising one or more hydrocarbon materials. Only those process acts and structures necessary to understand the embodiments of the disclosure are described in detail below. A person of ordinary skill in the art will understand that some process components (e.g., pipelines, line filters, valves, temperature detectors, pH meters, flow detectors, pressure detectors, and the like) are inherently disclosed herein and that adding various conventional process components and acts would be in accord with the disclosure. Additional acts or materials to recover a hydrocarbon material may be performed by conventional techniques.

Figure 1:
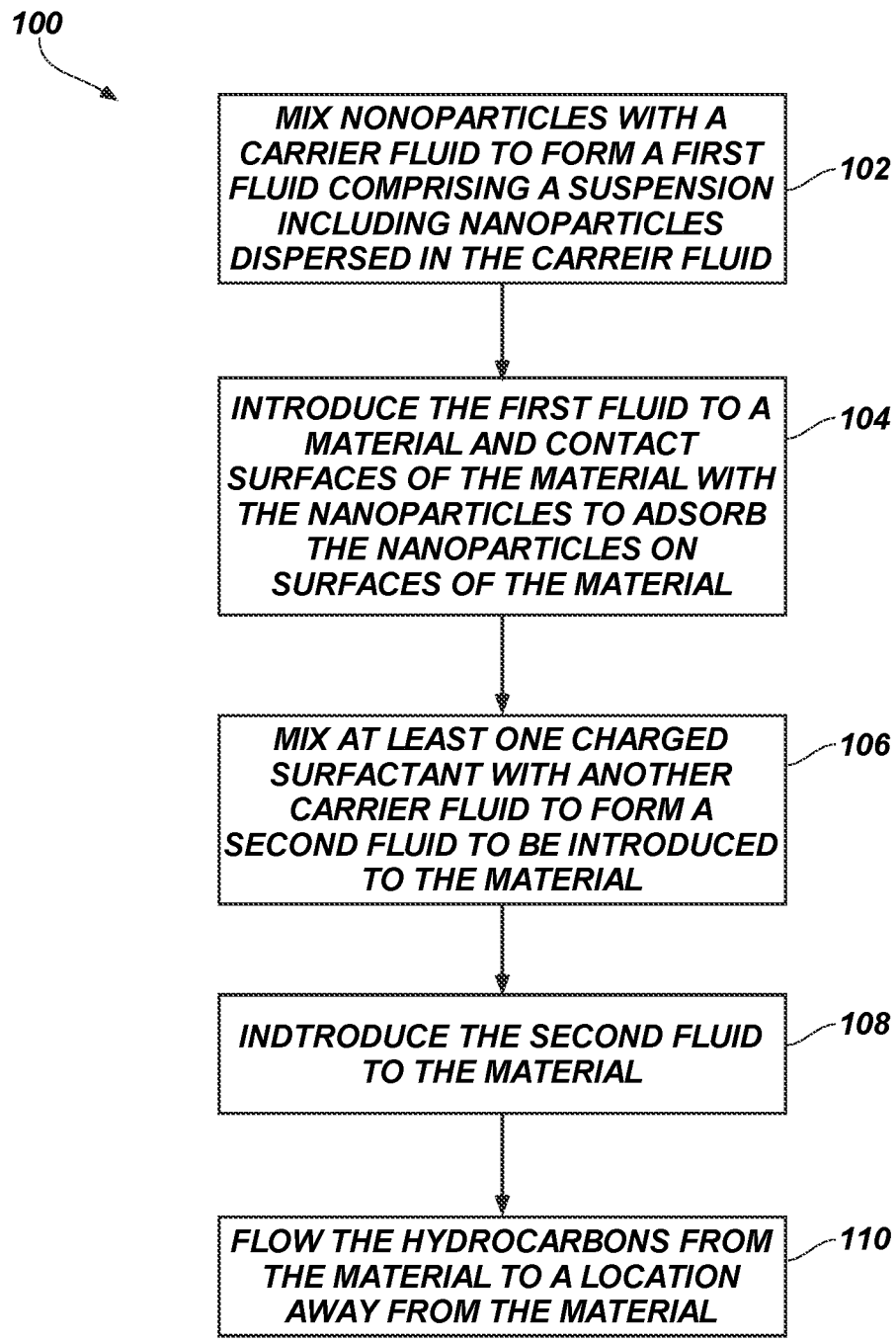
FIG. 1 is a simplified flow diagram illustrating a method of obtaining a hydrocarbon material from a subterranean formation, according to embodiments of the disclosure.

FIG. 1 is a simplified flow diagram illustrating a method 100 of obtaining a hydrocarbon material from a material (e.g., a subterranean formation, oil sands, bitumen, etc.), according to embodiments of the disclosure. The method 100 includes act 102, including mixing nanoparticles with a carrier fluid to form a first fluid comprising a suspension including nanoparticles dispersed in the carrier fluid; act 104, which involves a flooding process in which the first fluid is introduced to the material (e.g., into a subterranean formation, to oil sands, bitumen, etc.) and surfaces of the material are contacted with the nanoparticles to adsorb the nanoparticles on surfaces of the material; act 106, including mixing at least one charged surfactant with another carrier fluid to form a second fluid to be introduced to the material (e.g., injected into the subterranean formation, introduced to oil sands, bitumen, etc.); act 108, including introducing the second fluid into the material; and act 110, including flowing (e.g., driving, sweeping, forcing, etc.) the hydrocarbons from the material (e.g., the subterranean formation, the oil sands, bitumen, etc.) to a location away from the material.

Act 102 may include mixing nanoparticles with a carrier fluid to form a first fluid comprising a suspension including nanoparticles dispersed in the carrier fluid. The carrier fluid may include water, brine, seawater, condensate, steam, etc., or combinations thereof. In some embodiments, the carrier fluid includes brine, such as may be encountered within a wellbore. By way of nonlimiting example, a concentration of salts in the carrier fluid may be between about 20 g salt/kg water and about 2,000 g salt/kg water, such as between about 20 g salt/kg water and about 50 g salt/kg water, between about 50 g salt/kg water and about 100 g salt/kg water, between about 100 g salt/kg water and about 500 g salt/kg water, between about 500 g salt/kg water and about 1,000 g salt/kg water, or between about 1,000 g salt/kg water and about 2,000 g salt/kg water. However, the disclosure is not so limited and the brine may have a different concentration of salt.

The nanoparticles may include nanoparticles that exhibit a negatively charged core, nanoparticles that include a negatively charged surface, nanoparticles including anionic functional groups formulated and configured to interact with hydrocarbons in a material, such as with active sites of a subterranean formation or in oil sands, and combinations thereof. By way of nonlimiting example, the nanoparticles may include silica nanoparticles, functionalized silica nanoparticles, nanoparticles including a core comprising polyoctahedral silsesquioxane (POSS), metal nanoparticles (e.g., nanoparticles of one or more of iron, titanium, germanium, tin, lead, zirconium, ruthenium, nickel, cobalt, etc.), metal oxide nanoparticles (e.g., nanoparticles of one or more of oxides of iron, titanium, germanium, tin, lead, zirconium, ruthenium, nickel, cobalt, etc.), carbon nanoparticles (e.g., carbon nanotubes (e.g., single-walled carbon nanotubes (SWCNTs), multi-walled carbon nanotubes (MWCNTs), fullerenes, carbon nanodiamonds, graphene, graphene oxide)), aluminum silicate nanoparticles, alumina modified silica nanoparticles (which may also be referred to as aluminate modified silica nanoparticles), metal oxide modified silica nanoparticles, functionalized alumina modified silica nanoparticles, functionalized metal oxide silica nanoparticles, and combinations thereof. In some embodiments, the nanoparticles include silica nanoparticles, alumina modified silica nanoparticles, metal oxide modified silica nanoparticles, aluminum silicate nanoparticles (which may also be referred to as aluminosilicate nanoparticles), and combinations thereof. The aluminum silicate nanoparticles may include $Al_2SiO_5$ ($Al_2O_3.SiO_2$), $Al_2Si_2O_5(OH)_5$ ($Al_2O_3.2SiO_2.2H_2O$), $Al_2Si_2O_7$ ($Al_2O_3.2SiO_2$), $Al_6SiO_{13}$ ($3AlO_3.2SiO_2$), $Al_4SiO_8$ ($2Al_2O_3.SiO_2$), or combinations thereof. Accordingly, in some embodiments, the nanoparticles may comprise atoms of aluminum, silicon, and oxygen.

Figure 1A:
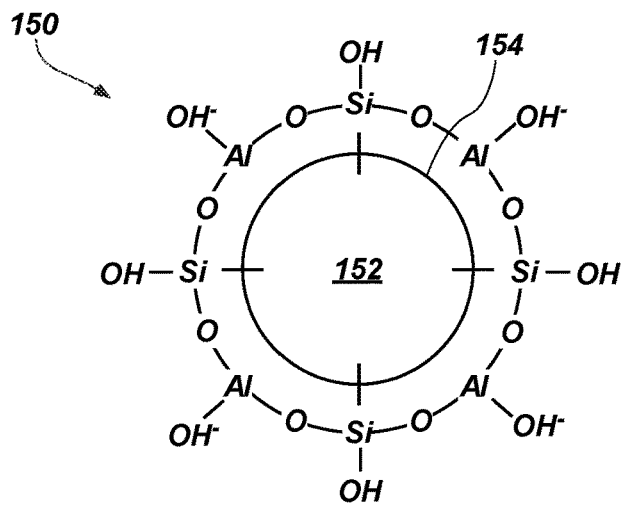
FIG. 1A is a simplified schematic of an alumina modified silica nanoparticle, according to embodiments of the disclosure.

In some embodiments, the nanoparticles comprise alumina modified silica nanoparticles. FIG. 1A is a simplified schematic of an alumina modified silica nanoparticle 150. The alumina modified silica nanoparticle 150 includes a core 152 comprising silica. Silicon atoms may be bonded to surfaces 154 of the core 152. The surface 154 may include alumina. For example, the silicon atoms on the surface 154 may be bonded to oxygen atoms, which in turn, may be bonded to aluminum atoms. In some embodiments, the silicon atoms at the surface 154 may include terminal hydroxyl groups and the aluminum atoms at the surface 154 may include negatively charged terminal hydroxyl groups.

Figure 1B:
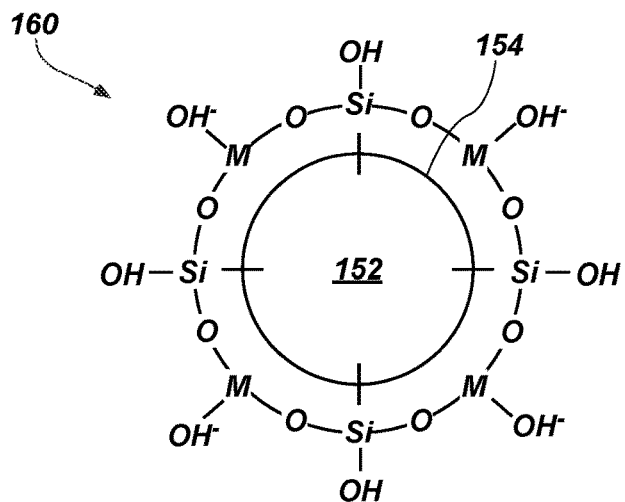
FIG. 1B is a simplified schematic of a metal oxide modified silica nanoparticle, according to embodiments of the disclosure.

In some embodiments, the nanoparticles comprise metal oxide modified silica nanoparticles. FIG. 1B is a simplified schematic of a metal oxide modified silica nanoparticle 160. The metal oxide modified silica nanoparticle 160 may be substantially similar to the alumina modified silica nanoparticle 150 (FIG. 1A), except that the surface 154 may not include aluminum atoms, but may include other metal atoms, represented as a "M" in FIG. 1B. The other metal atoms may include, for example, titanium, zirconium, gallium, boron, iron, indium, hafnium, another metal, or combinations thereof.

Figure 1C:
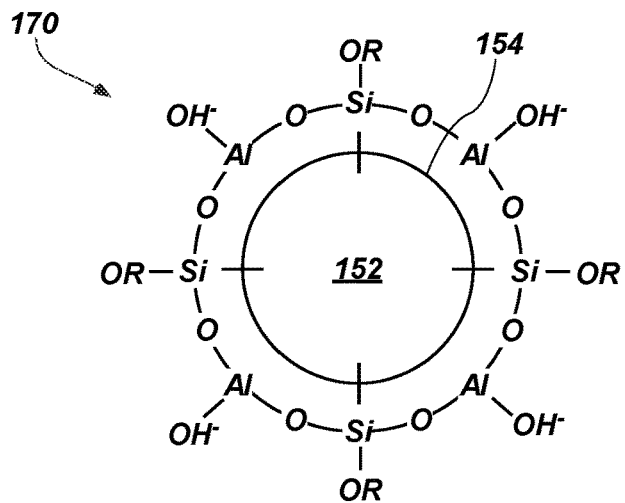
FIG. 1C is a simplified schematic of a functionalized alumina modified silica nanoparticle, according to embodiments of the disclosure.

In some embodiments, the nanoparticles comprise functionalized alumina modified silica nanoparticles. FIG. 1C is a simplified schematic of a functionalized alumina modified silica nanoparticle 170. The functionalized alumina modified silica nanoparticle 170 may be similar to the alumina modified silica nanoparticle 150 (FIG. 1A), except that silicon atoms on the surface 154 may not include terminal hydroxyl groups, but may include other terminal functional groups, represented as an "R" in FIG. 1C. The functional groups may include, for example, an alkyl silane, an aryl silane, (3-aminopropyl)triethoxysilane (APTES), (3-glycidylkoxypropyl)trimethoxysilane (also referred to as glymo silane), polyethylene glycol (PEG), one or more carbohydrates (e.g., a group including carbon, hydrogen, and oxygen atoms), or other functional groups.

In some embodiments, the nanoparticles may be functionalized by bonding a functional group R to silicon atoms to form functionalized nanoparticles, as described in U.S. patent application Ser. No. 15/940,459, titled "COMPOSITIONS OF MATTER COMPRISING SUSPENDED NANOPARTICLES AND RELATED METHODS," the disclosure of which is hereby incorporated herein in its entirety by this reference. The functional group may be an organosilicon functional group having a silicon atom and at least one organic moiety connected by a Si—C bond. The functional group R may provide stabilization to the functionalized nanoparticles, and may make the functionalized nanoparticles relatively more physically stable in the suspension. By way of nonlimiting example, the functional group R may be formed from any of the compounds listed and shown in Table I or any of the classes of compounds listed in Table II.

TABLE I

| Name | MW | Structure |
|---|---|---|
| (3-glycidyloxypropyl) trimethoxysilane (also known as GLYMO) | 236 | |
| 3-(trimethoxysilyl) propyl acrylate | 234 | |
| 3-(trimethoxysilyl) propyl methacrylate | 248 | |
| trimethoxy (octadecyl)silane | 375 | |
| hexadecyltrimethoxysilane | 347 | |
| trimethoxy(7-octen-1-yl)silane | 232 | |

TABLE II

| Description | Structure |
|---|---|
| methoxy PEG silane | |

TABLE II-continued

| Description | Structure |
|---|---|
| carboxylic acid terminated PEG silane | (CH$_3$CH$_2$O)$_3$Si—CH$_2$CH$_2$NHCNH—CH$_2$CH$_2$—(OCH$_2$CH$_2$)$_n$—COOH |
| amine terminated PEG silane | (CH$_3$CH$_2$O)$_3$Si—CH$_2$CH$_2$NHCNH—CH$_2$CH$_2$—(OCH$_2$CH$_2$)$_n$—NH$_2$ |
| O-[methoxy(polyethylene oxide)]-n-triethoxysilylpropyl)carbamate | CH$_3$O—(CH$_2$CH$_2$O)$_{15-20}$—C(=O)—NH—(CH$_2$)$_3$—Si(OCH$_2$CH$_3$)$_3$ |
| 2-[methoxypoly(ethylenoxy)6-9propyl]dimethylmethoxysilane | CH$_3$O—(CH$_2$CH$_2$O)$_{6-9}$—(CH$_2$)$_3$—Si(CH$_3$)$_2$OCH$_3$ |
| 2-[methoxy(polyethyleneoxy)6-9propyl]trichlorosilane | CH$_3$O—(CH$_2$CH$_2$O)$_{6-9}$—(CH$_2$)$_3$—SiCl$_3$ |
| 2-[methoxypoly(ethylenoxy)6-9propyl]dimethylchlorosilane | CH$_3$O—(CH$_2$CH$_2$O)$_{6-9}$—(CH$_2$)$_3$—Si(CH$_3$)$_2$Cl |
| [hydroxy(polyethyleneoxy)propyl]triethoxysilane | HO—(CH$_2$CH$_2$O)$_{8-12}$—(CH$_2$)$_3$—Si(OCH$_2$CH$_3$)$_3$ |

In some embodiments, the functional group R may include a glucose, sucrose-, or fructose-modified silane or siloxane. The functional group R may include an alkoxy group (i.e., an alkyl group singularly bonded to oxygen) bonded to silicon. The functional group R may be hydrophilic, which may improve the suspension of the functionalized nanoparticles in the suspension and/or carrier fluid. Each functionalized nanoparticle may include one or more functional groups R bonded thereto. The degree of stability of the functionalized nanoparticles may increase with an increasing number of functional groups R.

In some embodiments, the nanoparticles comprise functionalized metal oxide modified silica nanoparticles. In some such embodiments, the functionalized metal oxide modified silica nanoparticles may be substantially the same as the alumina modified silica nanoparticles, except that the aluminum atoms may be replaced with one or more metal atoms M, as described above.

Accordingly, the nanoparticles described herein may be functionalized with one or more of the functional groups described herein.

In some embodiments, the nanoparticles comprise a first group of nanoparticles comprising at least one of silica nanoparticles, and a second group of nanoparticles comprising one or more of aluminum silicate nanoparticle, alumina modified silica nanoparticles, and metal oxide modified silica nanoparticles, functionalized alumina modified silica nanoparticles, or functionalized metal oxide modified silica nanoparticles. In some embodiments, the nanoparticles comprise silica nanoparticles and aluminum silicate nanoparticles. In other embodiments, the nanoparticles comprise silica nanoparticles and alumina modified silica nanoparticles. In yet other embodiments, the nanoparticles comprise alumina modified silica nanoparticles and aluminum silicate nanoparticles. In some embodiments, the nanoparticles further comprise metal oxide modified silica nanoparticles. The nanoparticles may be functionalized.

In some embodiments, surfaces of the nanoparticles may be functionalized with an alkyl group, an alkenyl group, an alkynyl group, a hydroxyl group, an organohalide group, a halide group, a carbonyl group, an amine group, an organosulfur group, an epoxy group, and a polyamine group, an aryl group (e.g., an aralkyl or an alkaryl group), a carbonyl group (a carbonyl group (—C=O)), such as a ketone, an aldehyde, a carboxylate (—COO$^-$) group, an amine group, a thiol group, a phosphate (—PO$_4^{3-}$) group, another functional group, or combinations thereof.

In some embodiments, surfaces of the nanoparticles may be functionalized with functional groups formulated and configured to provide a negative charge to the surface of the nanoparticles (e.g., anionic functional groups). By way of nonlimiting example, the anionic functional groups may include one or more of hydroxyl (—OH$^-$) groups, carboxylate (—COO$^-$) groups, sulfonate (—SO$_3^-$) groups, phosphate (—PO$_4^{3-}$) groups, etc. In some embodiments, the functional groups may be formulated and configured to form nanoparticles formulated and configured to form a suspension having a negative zeta potential when mixed with the carrier fluid.

The functional group may be bonded directly to the core of the nanoparticle. In other embodiments, the functional group may be bonded to the core of the nanoparticle through one or more bridge groups (e.g., an R group, such as an alkyl group, an alkenyl group, an alkynyl group, a carbonyl group, an amine group, another group, or combinations thereof).

In some embodiments, at least some of the nanoparticles may be functionalized with at least a first type of functional group and at least some of the nanoparticles may be functionalized with at least a second type of functional group. By way of nonlimiting example, in some embodiments, at least some of the nanoparticles may be functionalized with sulfonate functional groups and at least some of the nanoparticles may be functionalized with carboxylate functional groups. As another example, at least some of the nanoparticles may be functionalized with phosphate groups and at least some of the nanoparticles may be functionalized with sulfonate groups or carboxylate groups. In yet other embodiments, at least some of the nanoparticles are functionalized with sulfonate groups, at least some of the nanoparticles are functionalized with phosphate groups, and at least some of the nanoparticles are functionalized with carboxylate groups. In other embodiments, at least some of the nanoparticles may not be functionalized and at least some of the nanoparticles may be functionalized. In further embodiments, at least some of the nanoparticles may be functionalized with for example, an alkyl silane, an aryl silane, APTES, (3-glycidylkoxypropyl)trimethoxysilane, PEG, one or more carbohydrates, or other functional groups and at least other of the nanopartilces may be functionalized with another of alkyl silane, APTES, (3-glycidylkoxypropyl) trimethoxysilane, PEG, one or more carbohydrates, or other functional groups.

The nanoparticles may include a hydrophobic coating on surfaces thereof (e.g., silica nanoparticles having a surface modified with a reactive epoxy silane), a hydrophilic coating on surfaces thereof (e.g., hydrophilic fumed silica, hydrophilic fumed silica including functionalized surfaces, or a combination thereof), or a combination thereof.

The nanoparticles may have a spherical shape, a cylindrical shape, a plate shape, or another suitable shape. In some embodiments, the nanoparticles have a spherical shape.

The nanoparticles may have a size between about 5 nm and about 100 nm. In some embodiments, the nanoparticles have a size between about 5 nm and about 10 nm, between about 10 nm and about 15 nm, between about 15 nm and about 20 nm, between about 20 nm and about 50 nm, or between about 50 nm and about 100 nm. The size of the nanoparticles may be selected to be less than a pore size of a subterranean formation in which the nanoparticles are to be introduced, an open pore dimension between grains of oil sands, etc. In some embodiments, the nanoparticles have a size less than about 100 nm, less than about 50 nm, less than about 20 nm, less than about 15 nm, less than about 10 nm, or even less than about 5 nm. The nanoparticles may be monodisperse, wherein each of the nanoparticles exhibit substantially the same size and shape, or may be polydisperse, wherein the nanoparticles include a range of sizes and/or shapes.

A concentration of the nanoparticles in the suspension may be between about 100 ppm and about 5,000 ppm, such as between about 100 ppm and about 200 ppm, between about 200 ppm and about 500 ppm, between about 500 ppm and about 1,000 ppm, between about 1,000 ppm and about 2,500 ppm, or between about 2,500 ppm and about 5,000 ppm. However, the disclosure is not so limited and the concentration of the nanoparticles in the suspension may be lower or higher depending on a particular application.

A pH of the suspension may be between about 3.0 and about 12.0. In some embodiments, the suspension may exhibit a basic pH, such as a pH greater than about 9.0, greater than about 10.0, or even greater than about 11.0. In other embodiments, the suspension may exhibit a pH between about 7.0 and about 9.0, such as about 8.0. In other embodiments, the suspension may exhibit an acidic pH, such as a pH between about 3.0 and about 7.0, such as between about 3.0 and about 5.0, or between about 5.0 and about 7.0. In some embodiments, the pH of the suspension may be about 3.0. However, the disclosure is not so limited and the suspension may exhibit a different pH.

In some embodiments, act 102 may be performed after primary hydrocarbon recovery and secondary hydrocarbon recovery. By way of nonlimiting example, act 102 may be performed after performing one or more of water flooding, steam flooding (e.g., steam assisted gravity drainage (SAGD), cyclic steam stimulation (CSS), vapor extraction, etc.), or one or more other forms of secondary hydrocarbon recovery.

Act 104 may include a flooding process including introducing the first fluid to the material and contacting surfaces of the material with the nanoparticles to adsorb the nanoparticles on surfaces of the material. Without wishing to be bound by any particular theory, it is believed that the nanoparticles interact with active sites of the material (e.g., subterranean formation, oil sands, bitumen, etc.) and form a monolayer of nanoparticles thereon. It is believed that the nanoparticles may remove a hydrocarbon film from surfaces of the material. In some embodiments, the nanoparticles may be formulated and configured to interact with active sites of surfaces of the material. By way of nonlimiting example, the nanoparticles may include amine functional groups. The nanoparticles may adhere to and interact with (e.g., bond with) surfaces of the material.

In some embodiments, act 104 may be performed after primary hydrocarbon recovery and secondary hydrocarbon recovery, such as one or more of water flooding and one or more other forms of secondary hydrocarbon recovery. In other embodiments, act 104 includes mixing nanoparticles with water used during water flooding processes. In some such embodiments, the nanoparticles in the water flooding solution or suspension may contact and adhere to surfaces of the material (subterranean formation, oil sands, bitumen, etc.). In some such embodiments, a first portion of water flooding may be performed without the nanoparticles and a second portion thereof may be performed with the nanoparticles. In yet other embodiments, act 104 may be performed immediately after primary after primary hydrocarbon recovery, without performing water flooding.

Act 106 includes mixing at least one charged (e.g., anionic) surfactant with another carrier fluid to form a second fluid to be introduced to the material (e.g., injected into the subterranean formation, introduced to oil sands, bitumen, etc.). The another carrier fluid may include water, brine, seawater, condensate, steam, etc., or combinations thereof. In some embodiments, the another carrier fluid includes brine. In some embodiments, the another carrier fluid comprises the same material as the carrier fluid used in act 102.

The charged surfactant may comprise an anionic surfactant including any surfactant formulated and configured to reduce an interfacial tension between a hydrocarbon phase and an aqueous phase and mobilize the hydrocarbon phase within the subterranean formation. The anionic surfactant may include at least one anionic surfactant selected from the group consisting of sulfonates (e.g., including one or more sulfonate ($-SO_3^-$) groups), sulfates (e.g., including one or more sulfate ($-SO_4^{2-}$) groups, carboxylates (e.g., including one or more carboxylate groups), phosphates (e.g., including one or more phosphate ($-PO_4^{3-}$) groups), or combinations thereof.

By way of nonlimiting example, the anionic surfactant may include a sodium alkyl sulfate (e.g., sodium dodecyl sulfate (SDS)), sodium alkyl aryl sulfonate, sodium dodecylbenzenesulfonate ($C_{18}H_{29}NaO_3S$), sodium laureth sulfate ($CH_3(CH_2)_{10}CH_2(OCH_2CH_2)_nOSO_3Na$), sodium stearate ($C_{18}H_{35}NaO_2$), sodium laurate ($CH_3(CH_2)_{10}CO_2Na$), sulfated alkanolamides, a benzyl dodecane sulfonate sodium salt, a glycolic acid ethoxylate lauryl ether, sulfo-caborboxylic compounds (e.g., sodium lauryl sulfoacetate, dioctyl sulfosuccinate, etc.), organo phosohored surfactants, sarcosides or alkyl amino acids, ammonium lauryl sulfate, sodium phosphates, phosphate esters, internal olefin surfactants, alcohol alkoxy sulfates, alkyl alkoxy carboxylates, other anionic surfactants, and combinations thereof. In some embodiments, the anionic surfactant comprises a carboxylated surfactant (e.g., sodium stearate, sodium lauroyl sarcosinate, etc.).

In some embodiments, the anionic surfactants may include the same groups as the functional groups of the nanoparticles described above with reference to act 102. For example, the where the anionic surfactant includes sulfonates, the nanoparticles may include sulfonate functional groups. In embodiments where the anionic surfactant includes carboxylates or phosphates, the nanoparticles may include carboxylate or phosphate functional groups, respectively. In some such embodiments, at least some of the anionic surfactants may include the same groups as the functional groups adhered to the surfaces of the material (e.g., subterranean formation, oil sands, bitumen, etc.) during act 104.

A concentration of the anionic surfactant in the carrier fluid may be between about 10 ppm and about 50,000 ppm, such as between about 10 ppm and about 50 ppm, between about 50 ppm and about 100 ppm, between about 100 ppm and about 200 ppm, between about 200 ppm and about 500 ppm, between about 500 ppm and about 1,000 ppm, between about 1,000 ppm and about 3,000 ppm, between about 3,000 ppm and about 5,000 ppm, between about 5,000 ppm and about 10,000 ppm, between about 10,000 ppm and about 30,000 ppm, or between about 30,000 ppm and about 50,000 ppm. However, the disclosure is not so limited and the concentration of the anionic surfactant may be different than those described. In some embodiments, a concentration of the anionic surfactant may be greater than a critical micelle concentration (CMC, a concentration of surfactants above which micelles form and additional surfactants added to the system form micelles). It is believed that a concentration of surfactants greater than the CMC may improve hydrocarbon recovery from the material. Without wishing to be bound by any particular theory, it is believed that above the CMC, a microemulsion may form between an aqueous phase and the hydrocarbon phase. The microemulsion may reduce an interfacial tension between the hydrocarbon phase and the aqueous phase and the solid phase of the subterranean formation. In addition, a concentration of surfactants greater than the CMC may increase hydrocarbon recovery from the material since, in some embodiments, at least some of the surfactant may be adsorbed onto surfaces of the material.

In some embodiments, the second fluid may not include nanoparticles. In other embodiments, the second fluid may include both the anionic surfactant and nanoparticles. In some such embodiments, the nanoparticles may have a negatively charged surface. By way of nonlimiting example, the second fluid may include silica nanoparticles, aluminum silicate nanoparticles, alumina modified silica nanoparticles, metal oxide modified silica nanoparticles, functionalized alumina modified silica nanoparticles, functionalized metal oxide modified silica nanoparticles, POSS nanoparticles, carbon nanoparticles, metal nanoparticles, metal oxide nanoparticles, or combinations thereof. In some embodiments, the nanoparticles comprise silica nanoparticles.

The nanoparticles may have the same size and shape as the nanoparticles described above with reference to the nanoparticles in the first fluid. In some embodiments, the nanoparticles in the second fluid are the same as the nanoparticles in the first fluid. In other embodiments, the nanoparticles in the first fluid and the nanoparticles in the second fluid are different. By way of nonlimiting example, the nanoparticles in the first fluid may be formulated and configured to interact with active sites on surfaces of the material (e.g., the subterranean formation, oil sands, bitumen, etc.). By way of nonlimiting example, where the material includes active sites including exposed hydroxyl groups, the nanoparticles in the first fluid may be formulated and configured to interact with the exposed hydroxyl groups thereof. In some such embodiments, the nanoparticles of the first fluid may include hydroxyl groups, amine groups, carboxylate groups, isocyanate groups, another functional group, sulfonate functional groups, phosphate functional groups, one or more of the R groups described above, and combinations thereof. The nanoparticles of the second fluid may include nanoparticles having a negatively charged core, exposed anionic functional groups, or both. In some embodiments, the nanoparticles of the second fluid include functional groups that are the same as the groups of the surfactant (e.g., where the surfactant comprises sulfonates, carboxylates, or phosphates, the nanoparticles may respectively include sulfonate, carboxylate, or phosphate functional groups.

In some embodiments, the nanoparticles in the second fluid have a different size (e.g., diameter) than the nanoparticles in the first fluid. By way of nonlimiting example, the nanoparticles of the second fluid may exhibit a lower mean diameter than the nanoparticles of the first fluid. In other embodiments, the nanoparticles of the second fluid may exhibit a greater mean diameter than the nanoparticles of the first fluid.

In some embodiments, a concentration of the surfactant in the second fluid may be greater than a concentration of the nanoparticles in the second fluid. By way of nonlimiting example, the concentration of surfactant in the second fluid may be between about 500 ppm and about 5,000 ppm and a concentration of the nanoparticles in the second fluid may be between about 100 ppm and about 2,000 ppm. In some embodiments, the concentration of the surfactant may be about 1,500 ppm and the concentration of the nanoparticles may be about 200 ppm.

In some embodiments, a ratio of surfactant to nanoparticles (e.g., a concentration of surfactant divided by a concentration of nanoparticles) in the second fluid may be greater than about 1.0. By way of nonlimiting example, the ratio of surfactant to nanoparticles in the second fluid may be greater than about 1.0, greater than about 1.5, greater than about 2.0, greater than about 2.5, greater than about 3.0, greater than about 4.0, greater than about 5.0, or even greater than about 10.0.

Act 108 includes introducing the second fluid into the material (e.g., the subterranean formation, oil sands, bitumen, etc.). An amount of anionic surfactant that is lost due to adsorption on surfaces of the material may be reduced because of the nanoparticles already attached to the active sites thereof in act 104. Without wishing to be bound by any particular theory, it is believed that introducing the nanoparticles during act 104 reduces a number of active sites in the material that may otherwise interact with the anionic surfactant such that a lesser amount of the anionic surfactant is lost caused by adsorption to surfaces of the material. Stated another way, introducing the nanoparticles into the material and adhering the nanoparticles to surfaces thereof prior to introducing the surfactant into the material may reduce an amount of surfactant lost in the material and may increase an effectiveness of the surfactant (e.g., by increased hydrocarbon recovery).

In some embodiments, where the second fluid includes nanoparticles, the nanoparticles of the second fluid may be formulated and configured to reduce a degree of interaction between the anionic surfactants and the active sites on surfaces of the material. Without wishing to be bound by any particular theory, it is believed that the nanoparticles including a negatively charged core, anionic functional groups, or both may interact with the anionic surfactant in the carrier fluid to facilitate transport of the anionic surfactant deeper into the material while reducing an adsorption of the anionic surfactant onto surfaces of the material. It is believed that the nanoparticles introduced to the material during act 104 may interact with the active sites on surfaces of the material, reducing a likelihood of adsorption of the surfactant in the second fluid with the active sites. In addition, it is believed that cations in the carrier fluid (e.g., $Ca^{2+}$ and $Mg^{2+}$ when the carrier fluid comprises brine) interact with any nanoparticles present in the second fluid and form a so-called "shell" around the nanoparticles due to ion-ion interactions between the negative charges associated with the nanoparticles and the cations in the carrier fluid. The anionic surfactants may be attracted to the positively charged shell of cations surrounding the nanoparticles in the second fluid and may form another shell around the cations surrounding the nanoparticles. Accordingly, the anionic heads of the surfactant may be oriented toward the shell of the nanoparticle and the tail portion of the surfactant may be oriented away from the nanoparticles. The tail portion of the anionic surfactant may include, for example, alkyl groups. Within the material, the tail portion of the anionic surfactant may be oriented toward the surfaces thereof while the anionic head portion remains directed toward the positively charged shell surrounding the nanoparticles. Accordingly, it may be more likely for the anionic heads of the anionic surfactants to interact with the nanoparticles than with the active sites of the material. In addition, due to the size of the nanoparticles, the nanoparticles may exhibit a substantially greater surface area than a surface area of the active sites of the material.

Act 110 includes flowing (e.g., driving, sweeping, forcing, etc.) the hydrocarbons from the material to a location away from the material (e.g., to a location above the subterranean formation). The surfactant may reduce an interfacial tension between the hydrocarbon phase and an aqueous phase. Accordingly, in some embodiments, the surfactant may increase a mobility of hydrocarbons within the subterranean formation and the hydrocarbons may be transported to above the subterranean formation.

Figure 2:
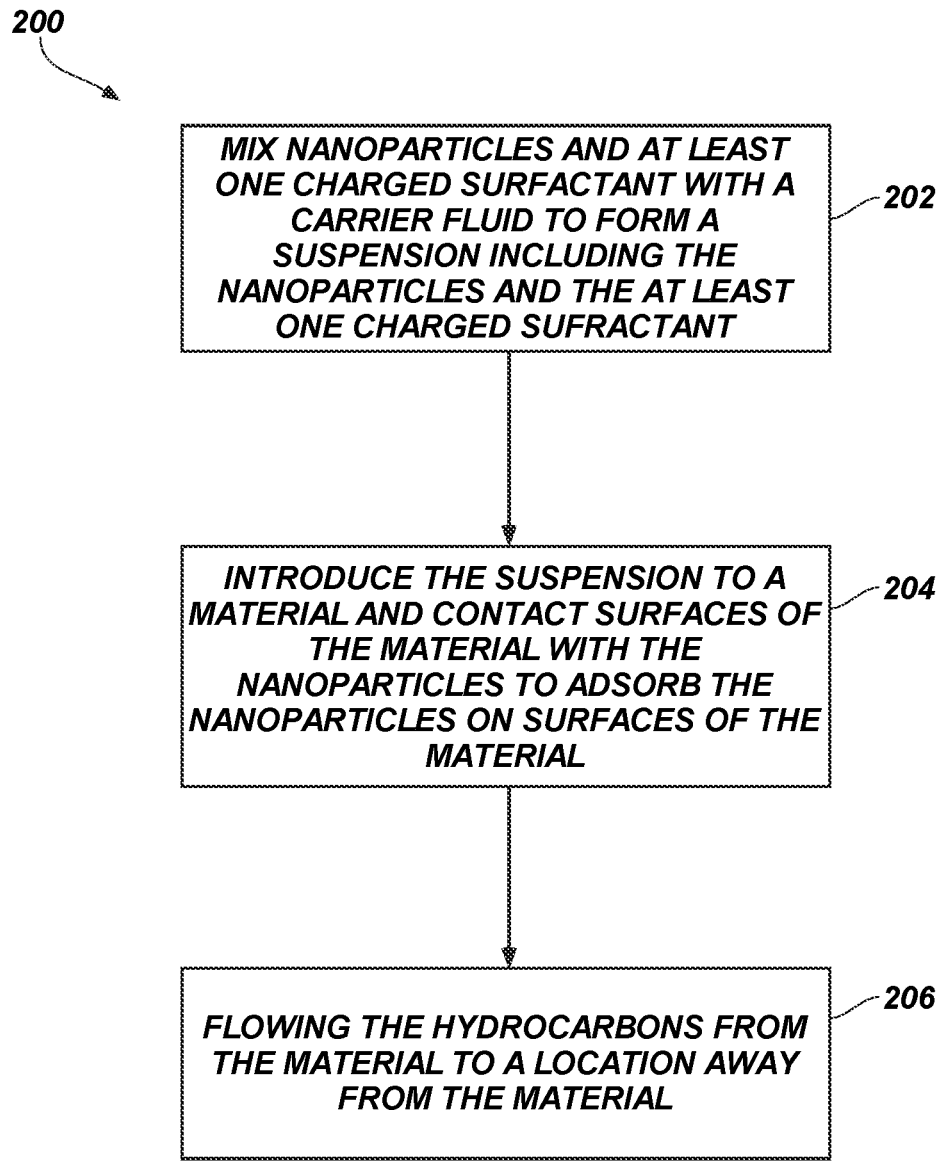
FIG. 2 is a simplified flow diagram illustrating a method of obtaining a hydrocarbon material from a subterranean formation, according to other embodiments of the disclosure.

Although FIG. 1 has been described as including sequentially introducing a first fluid and a second fluid to the material, the disclosure is not so limited. In other embodiments, a suspension comprising both the nanoparticles and the anionic surfactant may be introduced to a material simultaneously. FIG. 2 is a simplified flow diagram illustrating a method 200 of obtaining a hydrocarbon material from a material (e.g., a subterranean formation, oil sands, bitumen, etc.), according to embodiments of the disclosure. The method 200 includes act 202 including mixing nanoparticles and at least one charged (e.g., anionic) surfactant with a carrier fluid to form a suspension including the nanoparticles and the at least one anionic surfactant; act 204 including a flooding process including introducing the suspension to a material (e.g., into a subterranean formation, to oil sands, bitumen, etc.) and contacting surfaces of the material with the nanoparticles to adsorb the nanoparticles on surfaces thereof; and act 206 including flowing (e.g., driving, sweeping, forcing, etc.) the hydrocarbons from the material to a location away from the material (e.g., to a location above the subterranean formation).

Act 202 includes mixing nanoparticles and at least one charged (e.g., anionic) surfactant with a carrier fluid to form a suspension including the nanoparticles and the at least one anionic surfactant. The anionic surfactant may include the same anionic surfactants described above with reference to FIG. 1.

The nanoparticles may include the same nanoparticles as those described above with reference to FIG. 1. For example, the nanoparticles may exhibit a negatively charged core, may include a negatively charged surface, may include anionic functional groups formulated and configured to interact with active sites of a material (e.g., a subterranean formation, oil sands, bitumen, etc.), and combinations thereof. By way of nonlimiting example, the nanoparticles may include silica nanoparticles, nanoparticles including a core comprising polyoctahedral silsesquioxane (POSS), metal oxide nanoparticles (e.g., nanoparticles of one or more of oxides of iron, titanium, germanium, tin, lead, zirconium, ruthenium, nickel, cobalt, etc.), carbon nanoparticles (e.g., carbon nanotubes (e.g., single-walled carbon nanotubes (SWCNTs), multi-walled carbon nanotubes (MWCNTs), fullerenes, carbon nanodiamonds, graphene, graphene oxide), alumina modified silica nanoparticles, metal oxide modified silica nanoparticles, aluminum silicate nanoparticles, and combinations thereof. In some embodiments, the nanoparticles comprise or include silica nanoparticles, functionalized silica nanoparticles, alumina modified silica nanoparticles, functionalized alumina modified silica nanoparticles, functionalized metal oxide modified silica nanoparticles, aluminum silicate nanoparticles, or combinations thereof. The nanoparticles may include one or more functional groups as described above with reference to FIG. 1.

Act 204 may include a flooding process including introducing the suspension to a material (e.g., into a subterranean formation, oil sands, bitumen, etc.) and contacting surfaces thereof with the nanoparticles to adsorb the nanoparticles on surfaces of the material. Exposing the material to the suspension including both the nanoparticles and the anionic surfactant may substantially reduce an amount of surfactant losses due to adsorption of the anionic surfactant onto surfaces thereof.

Without wishing to be bound by any particular theory, it is believed that introducing nanoparticles including a negatively charged surface (e.g., silica nanoparticles) to the material and exposing the material to anionic surfactants simultaneously alters a wettability of the material surface (e.g., formation surfaces). It is believed that the nanoparticles alter a wettability of the material surface. The altered wettability of the material surface may substantially reduce an amount of surfactant that interacts with (e.g., adsorbs onto) surfaces of the material. Accordingly, more of the anionic surfactant may be present at a hydrocarbon/aqueous interface, reducing an interfacial tension therebetween and improving a flowability of hydrocarbons from the material.

Act 206 may include flowing (e.g., driving, sweeping, forcing, etc.) the hydrocarbons from the material (e.g., subterranean formation, oil sands, bitumen, etc.) to a location away from the material (e.g., to a location above the subterranean formation). In some embodiments, act 206 may be substantially the same as act 110 described above with reference to FIG. 1.

In some embodiments, the mixture of nanoparticles and the anionic surfactant may be stable (e.g., may not agglomerate) at temperatures as high as about 80° C. and at salinities that may be encountered during wellbore operations. Without wishing to be bound by any particular theory, it is believed that the unique combination of nanoparticles and anionic surfactants facilitate the stability of the suspension and use of the suspension in the subterranean formation to increase hydrocarbon recovery therefrom. In some embodiments, the surfactant may include a surfactant in addition to, or other than SDS, since in some instances SDS may not exhibit effectiveness in brine and temperatures greater than about 20° C. In some embodiments, the surfactant comprises a carboxylated surfactant. In some embodiments, the carboxylated surfactant used in combination with the nanoparticles may facilitate an increase in hydrocarbon recovery from the material. In some embodiments, the surfactant includes carboxylated surfactants and sulfonated surfactants. It is believed that carboxylated surfactants enhance hydrocarbon recovery and sulfonated surfactants increase a temperature stability of the mixture including the surfactants.

Without wishing to be bound by any particular theory, it is believed that the combination of nanoparticles and surfactant in the material (e.g., subterranean formation, oil sands, etc.) exhibit synergistic properties. It is believed that the nanoparticles form a wedge between hydrocarbons and the surface of the material. The nanoparticles may generate a disjoining pressure on the three-phase contact point (i.e., between the aqueous phase, the hydrocarbon phase, and the solid phase of the material). The disjoining pressure may mobilize the hydrocarbons. Since the nanoparticles include a negative charge (similar to the negative charge of the anionic surfactant), the nanoparticles, rather than the surfactant, may interact with the active sites of the material to reduce a loss of surfactant caused by adsorption. As the hydrocarbons are mobilized from surfaces of the material, the surfactant may interact with the hydrocarbons and reduce an interfacial tension between the hydrocarbon phase and the aqueous phase, increasing a mobility of the hydrocarbons.

EXAMPLES

Example 1

An amount of enhanced hydrocarbon recovery (e.g., enhanced oil recovery (EOR)) with suspensions comprising only nanoparticles, suspensions comprising only surfactants, and suspensions comprising nanoparticles and surfactants was compared. Table III below includes a composition of each suspension tested and includes an amount of hydrocarbon recovery for each suspension.

TABLE III

| Sample | Suspension | Pore Volume | $\Phi$ | Permeability (k) | Temp. (° C.) | $S_o$ | % ORWF | % EOR |
|---|---|---|---|---|---|---|---|---|
| 1 | 0.5 wt % silica nanoparticles | 38.1 | 22.3 | 1513 | 25 | 0.88 | 57.1 | 16-19 |
| 2 | 0.5 wt % silica nanoparticles | 50.7 | 32.1 | 5228 | 80 | 0.47 | 53.8 | 0.98 |
| 3 | 0.3 wt. % surface functionalized silica, pH 3 | 44.8 | 28.1 | 1921 | 70 | 0.63 | 69.1 | 1.3 |
| 4 | 0.2 wt. % surface modified silica | 34.5 | 21.9 | 987 | 80 | 0.76 | 49.4 | 0.5 |
| 5 | 1500 ppm surfactant | 33.2 | 21.0 | 975 | 80 | 0.75 | 52.8 | 5.9 |
| 6 | 200 ppm silica nanoparticles and 1,500 ppm surfactant | 32.0 | 20.3 | 647 | 80 | 0.75 | 51.2 | 10.0 |

In Table III, $\Phi$ represents a porosity of the sample (e.g., the material, such as a subterranean formation), $S_o$ is the initial oil saturation in the sample, % ORWF is the percent hydrocarbon recovery during water flooding, and % EOR is the percent of enhanced hydrocarbon recovery after flooding with the suspension.

In each sample, an initial water flooding process was performed on the sample to recover an initial amount of hydrocarbons therefrom, the amount of which recovery is indicated in the column labeled "% ORWF." Thereafter, each sample was flooded with the indicated suspension to further enhance hydrocarbon recovery therefrom. The additional amount of hydrocarbons recovered from each sample responsive to flooding with the suspension is shown in the column labeled "% EOR."

With reference to Table III, an amount of enhanced hydrocarbon recovery dramatically decreases when the nanoparticles in the suspension are exposed to a temperature greater than about 25° C. For example, at a temperature of about 25° C., silica nanoparticles enhance hydrocarbon recovery by between about 16% and about 19%. By way of contrast, hydrocarbon recovery is enhanced by only about 0.98%, about 1.3%, or about 0.5% when the silica nanoparticles are exposed to a temperature of about 80° C. or about 70° C.

Figure 3A:
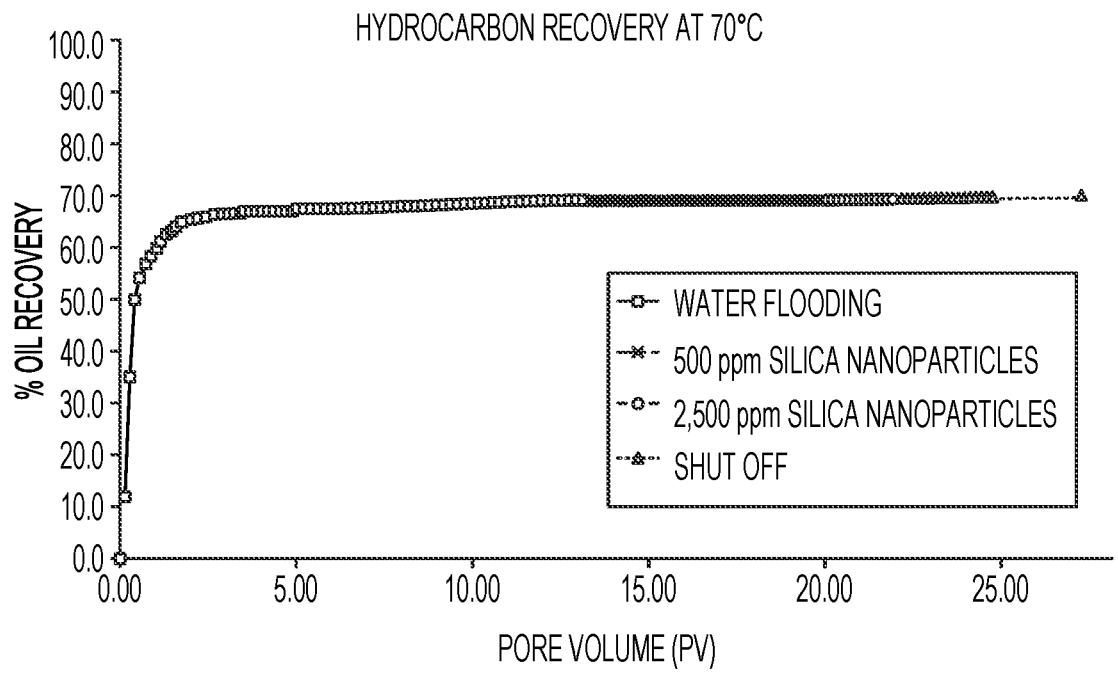
FIG. 3A is a graph illustrating a percent of hydrocarbon recovery as a function of a volume of fluid introduced into a core sample in a laboratory.

FIG. 3A is a graph illustrating a percent of hydrocarbon recovery as a function of a volume of fluid introduced into a core sample in a laboratory, the core sample representative of a subterranean formation, wherein the core sample had a temperature of about 70° C., a temperature that may be encountered in a subterranean formation and/or during hydrocarbon recovery from a material. An initial water flooding process resulted in about 65% hydrocarbon recovery. Thereafter, flooding with a solution including about 500 ppm of silica nanoparticles increased hydrocarbon recovery by about 0.50% and flooding with a solution including about 2,500 ppm of the silica nanoparticles further increased an amount of hydrocarbon recovery by another about 0.20%. An additional about 0.62% of hydrocarbons was recovered responsive to shutting the core sample in for between about 8 hours and about 12 hours.

Figure 3B:
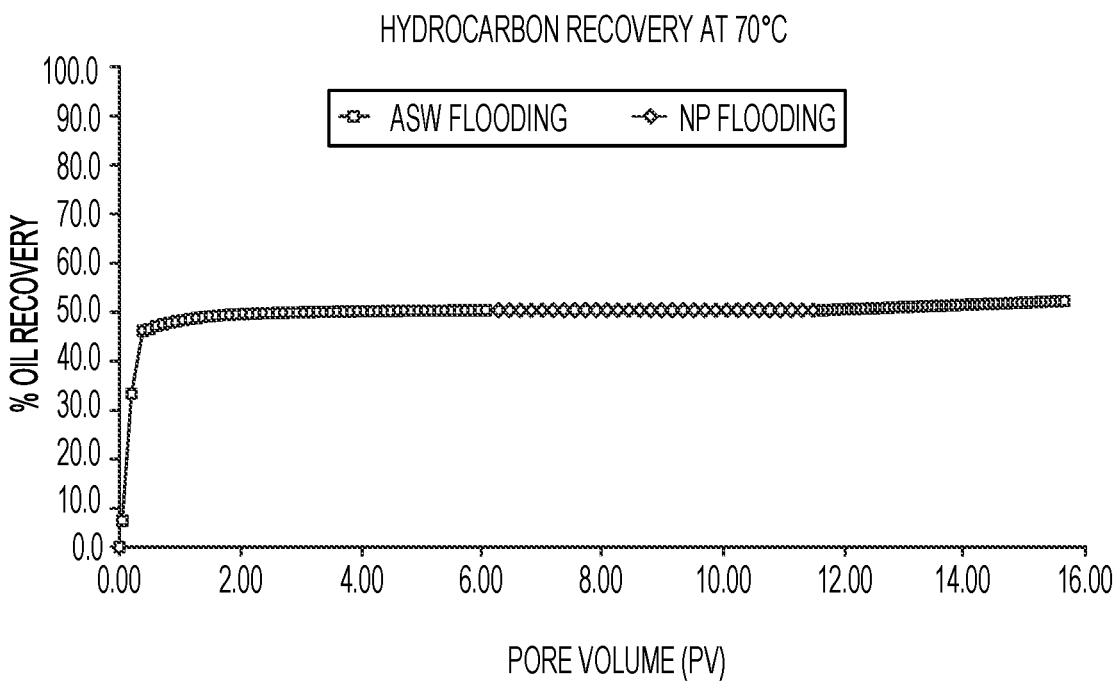
FIG. 3B is a graph illustrating a percent of hydrocarbon recovery as a function of fluid introduced into another core sample in a laboratory.

FIG. 3B is a graph illustrating a percent of hydrocarbon recovery as a function of fluid introduced into a core sample in a laboratory, wherein the core sample had a temperature of about 80° C. An initial flooding with artificial seawater (ASW) resulted in hydrocarbon recovery of about 50%. Thereafter, exposing the sample to a flooding solution comprising silica nanoparticles increased the hydrocarbon recovery by another about 0.5%. Comparing FIG. 3A and FIG. 3B, an amount of hydrocarbon recovery using water flooding or flooding with artificial seawater decreased with an increasing temperature of the core sample.

Referring again to Table III, an amount of hydrocarbon recovery flooding with a suspension including surfactants (Sample 5) was compared to an amount of hydrocarbon recovery responsive flooding with a suspension comprising the surfactant and silica nanoparticles (Sample 6).

Figure 3C:
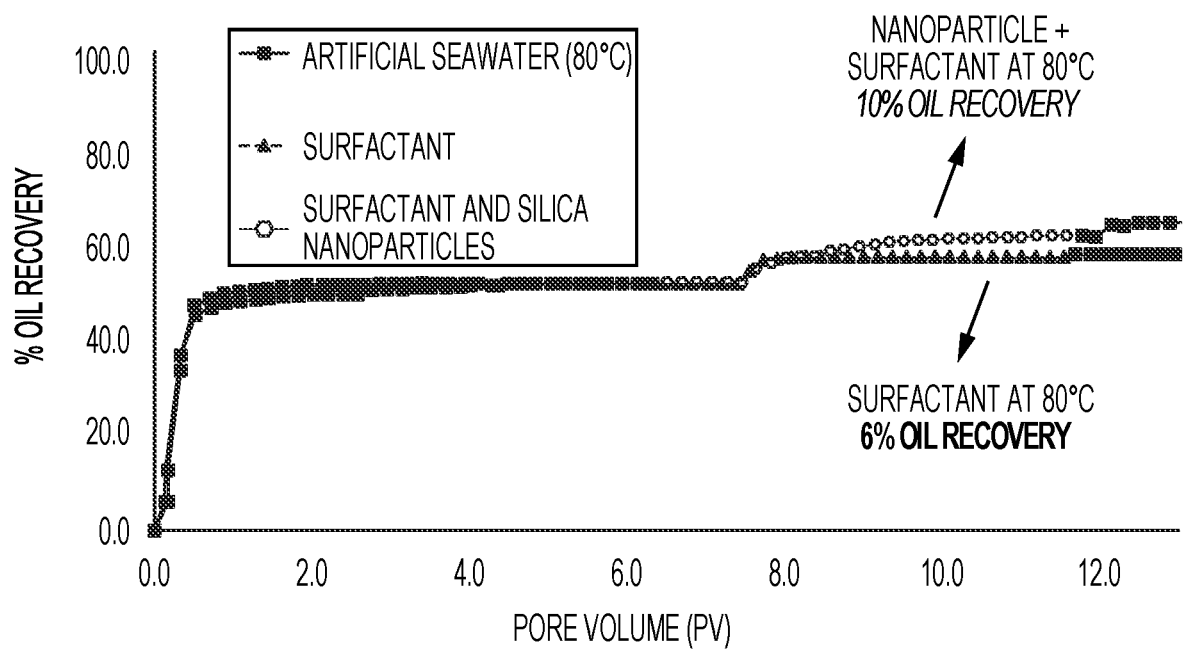
FIG. 3C is a graphical comparison of hydrocarbon recovery with a flooding suspension comprising only surfactants and a flooding suspension comprising nanoparticles and surfactants.

FIG. 3C graphically compares the results of Sample 5 and Sample 6. As shown in the graph, an amount of hydrocarbon recovery was increased by about 5.9% responsive to flooding with an additional fluid comprising surfactants, even when the sample was maintained at a temperature of about 80° C. Flooding a sample with a flooding suspension comprising the surfactant and silica nanoparticles increased hydrocarbon recovery from the sample by about 10.0%. Accordingly, it appears that the use of the surfactant and the nanoparticles in combination has a synergistic effect on hydrocarbon recovery from a hydrocarbon-containing material and appears to increase an amount of hydrocarbon recovery more than the individual sum of hydrocarbon recovery by flooding with only nanoparticles and flooding with only surfactant.

Example 2

An amount of enhanced hydrocarbon recovery from a sample responsive to sequential flooding with several different flooding solutions was measured. The sample exhibited a pore volume of about 35.1, a porosity of about 22.2, a permeability of about 472, a temperature of about 60° C., and an initial oil saturation of about 0.60.

The sample was first exposed to artificial seawater, resulting in recovery of about 77.4% of the hydrocarbons from the sample. Thereafter the sample was exposed to a solution comprising about 5,000 ppm of silica nanoparticles, followed by flooding with the artificial seawater. Thereafter, the artificial seawater remained in the sample overnight (for between about 8 hours and about 12 hours). Then, the sample was flooded with a suspension including about 3,000 ppm silica nanoparticles and about 2,000 ppm of sodium dodecyl sulfate (SDS), followed by flooding with a solution comprising about 2,000 ppm SDS, and then flooding with a suspension comprising about 3,000 ppm silica nanoparticles and 2,000 ppm SDS. Table IV below shows the amount of hydrocarbon recovery responsive to the different flooding operations.

TABLE IV

| Flooding | Flooding Fluid | % Recovery |
| --- | --- | --- |
| 1 | ASW | 77.4 |
| 2 | 5,000 ppm silica nanoparticles | 0.8 |
| 3 | ASW | 1.6 |
| 4 | Shut in | 1.4 |
| 5 | 3,000 ppm silica nanoparticles + 2,000 ppm SDS | 7.9 |
| 6 | 2,000 ppm SDS | 0.3 |
| 7 | 3,000 ppm silica nanoparticles + 2,000 ppm SDS | 0.2 |

Figure 4:
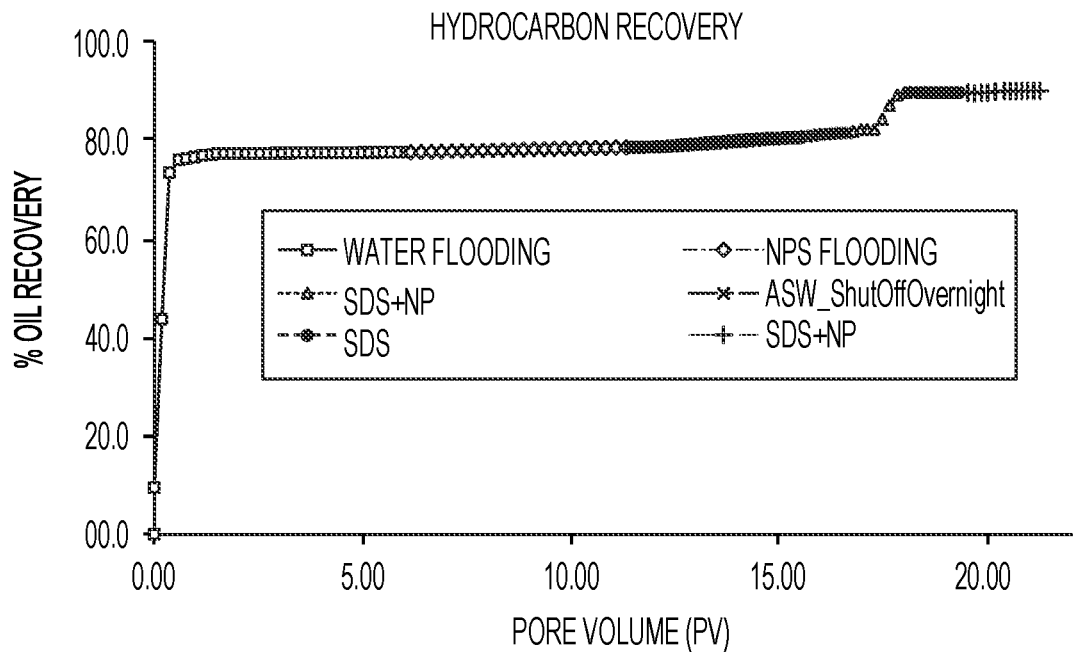
FIG. 4 is graphical representation of an amount of hydrocarbon recovery from the sample responsive to a plurality of flooding operations.

Referring to Table IV, an amount of hydrocarbon recovery from the sample increased by about 7.9% responsive to exposure to the flooding suspension comprising the silica nanoparticles and the SDS surfactant after the sample had previously been exposed to a flooding suspension comprising silica nanoparticles. FIG. 4 is a graphical representation of an amount of hydrocarbon recovery from the sample responsive to each of the flooding operations.

Example 3

An amount of enhanced hydrocarbon recovery from a sample responsive to sequential exposure to several different flooding solutions was measured. The sample exhibited a pore volume of about 34.4, a porosity of about 22.0, a permeability of about 1613, a temperature of about 60° C., and an initial oil saturation of about 0.77.

The sample was first flooded with a solution of artificial seawater, resulting in recovery of about 50.1% of the hydrocarbons from the sample. Thereafter the sample was flooded with a solution comprising about 2,000 ppm of SDS. Thereafter, the sample was flooded with a suspension comprising 3,000 ppm silica nanoparticles and 2,000 ppm SDS, then flooded with a suspension comprising 20,000 ppm silica nanoparticles and 2,000 ppm SDS, and then flooded with a suspension comprising 10,000 ppm silica nanoparticles and 2,000 ppm SDS. Table V below shows the amount of hydrocarbon recovery responsive to the different flooding operations.

TABLE V

| Flooding | Flooding Fluid | % Recovery |
| --- | --- | --- |
| 1 | ASW | 50.1 |
| 2 | 2,000 ppm SDS | 3.7 |

TABLE V-continued

| Flooding | Flooding Fluid | % Recovery |
|---|---|---|
| 3 | 2,000 ppm SDS + 3,000 ppm silica nanoparticles | 0.2 |
| 4 | 2,000 ppm SDS + 20,000 ppm silica nanoparticles | 0.1 |
| 5 | 2,000 ppm SDS + 10,000 ppm silica nanoparticles | 0.1 |

Figure 5:
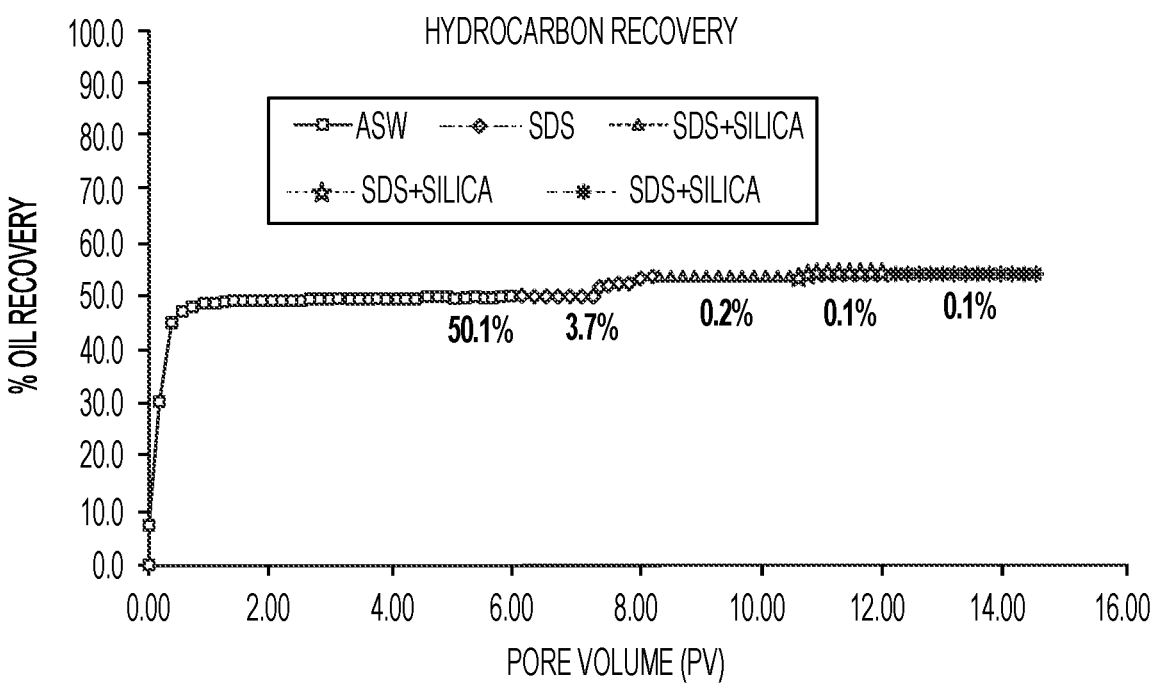
FIG. 5 is a graphical representation of an amount of hydrocarbon recovery from another sample responsive to a plurality of flooding operations.

FIG. 5 is a graphical representation of the amount of hydrocarbon recovery from the sample responsive to each flooding operation. In some embodiments, the amount of hydrocarbon recovery does not appear to increase as significantly when the sample is exposed to the SDS surfactant prior to exposure to the nanoparticles.

Example 4

Adsorption of surfactants on surfaces of a subterranean formation sample and adsorption of silica nanoparticle on the surfaces of the sample were measured. The results are shown in Table VI below.

TABLE VI

| Flooding Fluid | Absorption (mg/g sample) |
|---|---|
| Silica nanoparticles in artificial seawater | 0.30 |
| Carboxylated surfactant in distilled water | 0.08 |
| Carboxylated surfactant in artificial seawater | 0.81 |
| Carboxylated surfactant after exposure of sample to silica nanoparticles in artificial seawater | 0.26 |

Accordingly, an amount of silica nanoparticles adsorbed onto surfaces of the sample was greater when the carrier fluid comprised artificial seawater than when the carrier fluid comprised distilled water. Thus, a loss of nanoparticles due to adsorption increased with increasing salinity of the carrier fluid. In an artificial seawater carrier fluid, the SDS surfactant exhibited an adsorption of about 0.81 mg surfactant/g sample. By way of contrast, exposing the sample to silica nanoparticles in artificial seawater prior to exposing the sample to the SDS surfactant significantly reduced the amount of SDS surfactant adsorbed by the sample. For example, the adsorption of the SDS was decreased from 0.81 mg/g to about 0.26 mg/g, a decrease of over two-thirds.

Accordingly, providing a suspension including nanoparticles and anionic surfactants or sequentially providing nanoparticles and anionic surfactants to the material (e.g., the subterranean formation, oil sands, bitumen, etc.) may substantially reduce an amount of surfactant that adsorbs onto surfaces thereof. The nanoparticles may alter a hydrocarbon-water interface in the presence of the anionic surfactant. The nanoparticles may mobilize hydrocarbons from the material by disjoining pressure. The anionic surfactants may form a wedge at an interface between the surfaces of the material, a hydrocarbon phase, and an aqueous phase. The combination of the nanoparticles and the surfactant may improve surfactant performance within the material, even when exposed to high temperatures (e.g., a temperature greater than about 50° C., a temperature greater than about 60° C., a temperature greater than about 70° C., or even a temperature greater than about 80° C.) and high salinity.

Additional nonlimiting example embodiments of the disclosure are described below.

Embodiment 1: A method of recovering hydrocarbons from a subterranean formation, the method comprising: introducing a suspension comprising at least one of silica nanoparticles or aluminum silicate nanoparticles into a subterranean formation; contacting surfaces of the subterranean formation with the suspension to form a layer of the at least one of silica nanoparticles or aluminum silicate nanoparticles on at least some surfaces of the subterranean formation; after introducing the suspension comprising the at least one of silica nanoparticles or aluminum silicate nanoparticles into the subterranean formation, introducing a solution comprising at least one anionic surfactant into the subterranean formation; and extracting hydrocarbons from the subterranean formation.

Embodiment 2: The method of Embodiment 1, further comprising selecting the at least one of silica nanoparticles or aluminum silicate nanoparticles to have a diameter less than about 100 nm.

Embodiment 3: The method of Embodiment 1 or Embodiment 2, wherein introducing a solution comprising at least one anionic surfactant into the subterranean formation comprises introducing a solution comprising at least one anionic surfactant and the at least one of silica nanoparticles or the aluminum silicate nanoparticles into the subterranean formation simultaneously.

Embodiment 4: The method of any one of Embodiments 1 through 3, further comprising selecting the at least one anionic surfactant to comprise sodium dodecyl sulfate.

Embodiment 5: The method of any one of Embodiments 1 through 4, wherein introducing a solution comprising at least one anionic surfactant into the subterranean formation comprises introducing the solution into a subterranean formation having a temperature greater than about 80° C.

Embodiment 6: The method of any one of Embodiments 1 through 5, wherein introducing a suspension comprising at least one of silica nanoparticles or aluminum silicate nanoparticles into a subterranean formation comprises introducing a suspension comprising silica nanoparticles dispersed in a brine carrier fluid into the subterranean formation.

Embodiment 7: The method of any one of Embodiments 1 through 6, further comprising forming the solution to include between about 10 ppm and about 50,000 ppm of the at least one anionic surfactant.

Embodiment 8: The method of any one of Embodiments 1 through 7, further comprising selecting the at least one of silica nanoparticles or aluminum silicate nanoparticles to include at least one anionic functional group.

Embodiment 9: The method of any one of Embodiments 1 through 8, further comprising at least one of water flooding and steam flooding the subterranean formation prior to introducing the suspension comprising the at least one of silica nanoparticles or aluminum silicate nanoparticles into the subterranean formation.

Embodiment 10: The method of any one of Embodiments 1 through 9, wherein introducing a solution comprising at least one anionic surfactant into the subterranean formation comprises introducing a solution comprising additional nanoparticles into the subterranean formation, wherein the additional nanoparticles are different from the at least one of silica nanoparticles or aluminum silicate nanoparticles in the suspension.

Embodiment 11: The method of any one of Embodiments 1 through 10, further comprising selecting the at least one of silica nanoparticles or aluminum silicate nanoparticles to comprise at least one functional group formulated and configured to react with hydroxyl groups on surfaces of the subterranean formation.

Embodiment 12: A method of recovering hydrocarbons from a subterranean formation, the method comprising: mixing nanoparticles having a diameter less than about 100 nm with a carrier fluid comprising brine and at least one anionic surfactant to form a suspension, the nanoparticles comprising silica nanoparticles, aluminum silicate nanoparticles, or a combination thereof; introducing the suspension into a subterranean formation having a temperature greater than about 50° C.; and extracting hydrocarbons from the subterranean formation.

Embodiment 13: The method of Embodiment 12, further comprising selecting the at least one anionic surfactant to comprise a sulfate or a sulfonate.

Embodiment 14: The method of Embodiment 12 or Embodiment 13, further comprising selecting the at least one anionic surfactant to comprise a phosphate.

Embodiment 15: The method of any one of Embodiments 12 through 14, further comprising selecting the at least one anionic surfactant to comprise at least one carboxylate surfactant and at least one sulfonate surfactant.

Embodiment 16: The method of any one of Embodiments 12 through 15, further comprising selecting the nanoparticles to comprise at least a first type of silica nanoparticle and at least a second type of silica nanoparticle.

Embodiment 17: The method of any one of Embodiments 12 through 16, further comprising: selecting the first type of silica nanoparticles to comprise silica nanoparticles including at least one functional group; and selecting the second type of silica nanoparticles to be substantially free of functional groups.

Embodiment 18: The method of any one of Embodiments 12 through 17, further comprising selecting the nanoparticles to comprise aluminum silicate nanoparticles.

Embodiment 19: The method of any one of Embodiments 12 through 18, further comprising introducing another suspension comprising nanoparticles into the subterranean formation prior to introducing the suspension comprising the nanoparticles and the at least one anionic surfactant into the subterranean formation.

Embodiment 20: A method of recovering hydrocarbons from a subterranean formation, the method comprising: introducing a suspension comprising nanoparticles selected from the group consisting of silica and aluminum silicate into a subterranean formation; adhering the nanoparticles to surfaces within the subterranean formation; and after introducing the suspension comprising nanoparticles into the subterranean formation, introducing a solution comprising at least one anionic surfactant into the subterranean formation.

Embodiment 21: A method of recovering hydrocarbons, the method comprising: introducing a suspension comprising nanoparticles to a material; contacting surfaces of the material with the suspension; after introducing the suspension comprising the nanoparticles to the material, introducing at least one charged surfactant to the material; and removing hydrocarbons from the material.

Embodiment 22: The method of Embodiment 21, wherein contacting surfaces of the material with the suspension comprises forming a layer of the nanoparticles on the surfaces of the material.

Embodiment 23: The method of Embodiment 21 or Embodiment 22, wherein introducing at least one charged surfactant to the material comprises introducing an anionic surfactant to the material.

Embodiment 24: The method of any one of Embodiments 21 through 23, wherein introducing a suspension comprising nanoparticles to a material comprises introducing at least a first type of silica nanoparticles and at least a second type of silica nanoparticles to the material.

Embodiment 25: The method of any one of Embodiments 21 through 24, wherein introducing at least one charged surfactant to the material comprises introducing the solution into a subterranean formation having a temperature greater than about 50° C.

Embodiment 26: The method of any one of Embodiments 21 through 25, wherein introducing a suspension comprising nanoparticles to a material comprises introducing a suspension including nanoparticles comprising aluminum atoms and silicon atoms to the material.

Embodiment 27: The method of any one of Embodiments 21 through 26, wherein introducing a suspension comprising nanoparticles to a material comprises introducing a suspension comprising one of silica nanoparticles, functionalized silica nanoparticles, aluminum silicate nanoparticles, alumina modified silica nanoparticles, metal oxide modified nanoparticles, functionalized alumina modified silica nanoparticles, and functionalized metal oxide modified nanoparticles to the material.

Embodiment 28: The method of any one of Embodiments 21 through 27, further comprising selecting the nanoparticles to include at least one anionic functional group Embodiment 29: The method of any one of Embodiments 21 through 28, wherein introducing a suspension to a material comprises introducing a suspension into a subterranean formation, further comprising at least one of water flooding and steam flooding the subterranean formation prior to introducing the suspension into the subterranean formation.

Embodiment 30: The method of any one of Embodiments 21 through 29, wherein introducing at least one charged surfactant to the material comprises introducing a solution comprising additional nanoparticles and the at least one charged surfactant to the material.

Embodiment 31: The method of any one of Embodiments 21 through 30, further comprising selecting the nanoparticles to comprise at least one functional group formulated and configured to react with hydroxyl groups on surfaces of material.

Embodiment 32: A method of recovering hydrocarbons, the method comprising: introducing a fluid comprising at least one charged surfactant and nanoparticles comprising aluminum atoms and silicon atoms to a material at a temperature greater than about 50° C.; and removing hydrocarbons from the material.

Embodiment 33: The method of Embodiment 32, further comprising selecting the at least one charged surfactant to comprise a sulfate or a sulfonate.

Embodiment 34: The method of Embodiment 32 or Embodiment 33, further comprising selecting the at least one charged surfactant to comprise at least one carboxylate surfactant and at least one sulfonate surfactant.

Embodiment 35: The method of any one of Embodiments 32 through 34, further comprising selecting the at least one charged surfactant to comprise sodium dodecyl sulfate.

Embodiment 36: The method of any one of Embodiments 32 through 35, further comprising selecting the nanoparticles to comprise alumina modified silica nanoparticles.

Embodiment 37: The method of any one of Embodiments 32 through 36, wherein introducing a fluid comprising at least one charged surfactant and nanoparticles to a material comprises introducing a fluid comprising: first nanoparticles functionalized with at least a first type of functional group; and second nanoparticles functionalized with at least a second type of function group.

Embodiment 38: The method of any one of Embodiments 32 through 37, further comprising selecting the nanoparticles to comprise aluminum silicate nanoparticles.

Embodiment 39: The method of any one of Embodiments 32 through 38, further comprising introducing another fluid comprising nanoparticles to the material prior to introducing the fluid comprising the at least one surfactant and nanoparticles to the material.

Embodiment 40: A method of recovering hydrocarbons, the method comprising: introducing nanoparticles selected from the group consisting of silica, aluminum silicate, and alumina modified silica nanoparticles, and metal oxide modified nanoparticles; adhering the nanoparticles to the material; and after introducing the nanoparticles to the material, introducing at least one surfactant to the material.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of recovering hydrocarbons, the method comprising:
   introducing a suspension comprising nanoparticles and substantially free of surfactants to a formation comprising hydrocarbons;
   adhering the nanoparticles to surfaces of the formation; and
   after adhering the nanoparticles to the surfaces of the formation, introducing another suspension to the formation to remove the hydrocarbons from the formation, the another suspension comprising at least one charged surfactant.

2. The method of claim 1, wherein adhering the nanoparticles to surfaces of the formation comprises forming a layer of the nanoparticles on the surfaces of the formation.

3. The method of claim 1, further comprising selecting the at least one charged surfactant to comprise an anionic surfactant.

4. The method of claim 1, further comprising selecting the nanoparticles to comprise at least a first type of silica nanoparticles and at least a second type of silica nanoparticles.

5. The method of claim 1, wherein introducing at least one charged surfactant to the material comprises introducing a solution comprising the at least one charged surfactant into a subterranean formation having a temperature greater than about 50° C.

6. The method of claim 1, further comprising selecting the nanoparticles to comprise aluminum atoms and silicon atoms.

7. The method of claim 1, further comprising selecting the nanoparticles to comprise one of silica nanoparticles, functionalized silica nanoparticles, aluminum silicate nanoparticles, alumina modified silica nanoparticles, metal oxide modified nanoparticles, functionalized alumina modified silica nanoparticles, and functionalized metal oxide modified nanoparticles.

8. The method of claim 1, wherein introducing another suspension to the formation comprises introducing a solution comprising additional nanoparticles and the at least one charged surfactant to the formation, wherein a ratio of the at least one charged surfactant to the additional nanoparticles is greater than about 1.0.

9. The method of claim 1, further comprising at least one of water flooding and steam flooding the formation prior to introducing the suspension into the formation.

10. The method of claim 1, wherein introducing another suspension to the formation comprises introducing a solution comprising additional nanoparticles and the at least one charged surfactant to the formation, the additional nanoparticles having a different material composition than the nanoparticles of the suspension.

11. The method of claim 1, further comprising selecting the nanoparticles to comprise at least one functional group formulated and configured to react with hydroxyl groups on surfaces of the formation.

12. A method of recovering hydrocarbons, the method comprising:
   introducing nanoparticles to a subterranean formation comprising hydrocarbons, the nanoparticles selected from the group consisting of silica, aluminum silicate, and alumina modified silica nanoparticles, and metal oxide modified nanoparticles, the nanoparticles introduced without surfactants;
   adhering the nanoparticles to the subterranean formation; and
   after adhering the nanoparticles to the subterranean formation, introducing at least one surfactant to the subterranean formation, the at least one surfactant introduced to the subterranean formation separately from the nanoparticles.

13. The method of claim 12, wherein introducing nanoparticles to a material comprises introducing nanoparticles comprising aluminum silicate to the material.

* * * * *